US 9,826,583 B1

United States Patent
Xiong et al.

(10) Patent No.: US 9,826,583 B1
(45) Date of Patent: Nov. 21, 2017

(54) AUXILIARY POWER SUPPLY WITH DYNAMICALLY ADJUSTABLE OUTPUT

(71) Applicant: Universal Lighting Technologies, Inc., Madison, AL (US)

(72) Inventors: Wei Xiong, Madison, AL (US); Candice Ungacta, Huntsville, AL (US); Danny Pugh, Harvest, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/298,981

(22) Filed: Oct. 20, 2016

Related U.S. Application Data (60) Provisional application No. 62/268,655, filed on Dec. 17, 2015.

(51) Int. Cl.
*H05B 33/08* (2006.01)
*H02M 7/06* (2006.01)

(52) U.S. Cl.
CPC .......... *H05B 33/0812* (2013.01); *H02M 7/06* (2013.01); *H05B 33/0845* (2013.01)

(58) Field of Classification Search
CPC ............... H05B 33/08; H05B 33/0809; H05B 33/0812; H05B 33/0836; H05B 33/0842; H05B 33/0845; H05B 33/0854; H05B 37/02; H02M 7/00; H02M 7/06
See application file for complete search history.

(56) References Cited

U.S. PATENT DOCUMENTS

| 2010/0237786 A1* | 9/2010 | Santo ................. G09G 3/342 315/185 R |
| 2014/0333226 A1* | 11/2014 | Singh ................. H05B 33/0809 315/282 |
| 2016/0255683 A1* | 9/2016 | Wu ................. H05B 33/0812 315/192 |

* cited by examiner

*Primary Examiner* — Thai Pham
(74) *Attorney, Agent, or Firm* — Patterson Intellectual Property Law, P.C.; Mark J. Patterson; Grant M. Ford (57) ABSTRACT

An adjustable auxiliary power supply for a light emitting diode (LED) driver for adjusting an auxiliary power output includes a voltage regulator configured to receive a regulator input voltage and to output an auxiliary power supply voltage selected from a first output voltage and a second output voltage according to a voltage selection signal used to control an LED lighting setting. The adjustable auxiliary power supply includes a first and second input voltage circuits configured to selectively output respective first and second input voltages to the voltage regulator. The adjustable auxiliary power supply includes an adjustable resistance circuit coupled to the voltage regulator. The adjustable resistance circuit controls the auxiliary power supply voltage based upon an adjustable resistance setting of the adjustable resistance circuit. The adjustable resistance setting is configured to correspond to at least one of the first output voltage and the second output voltage.

20 Claims, 4 Drawing Sheets

AUXILIARY POWER SUPPLY WITH DYNAMICALLY ADJUSTABLE OUTPUT

CROSS-REFERENCES TO RELATED APPLICATIONS

This application claims benefit of U.S. Provisional Patent Application No. 62/268,655, dated Dec. 17, 2015, entitled "Auxiliary Power Supply with Dynamically Adjustable Output for an LED Lighting Controller," and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to power supplies for a light emitting diode (LED) lighting system. More particularly, the present invention relates to providing an auxiliary power supply for an LED driver which minimizes power loss across an auxiliary power supply based on a configurable output voltage and voltage regulator input configuration.

LED lighting is growing in popularity due to decreasing costs and long life compared to incandescent lighting and fluorescent lighting. One major reason is that the lumen per watt of LED is getting higher and higher than fluorescent lamp. Another reason is that the super capability of dimming, which will not hurt LED life comparing to fluorescent lamp dimming.

LED drivers are often coupled to a dimming controller to control light output of an LED lighting system to reduce energy usage and associated costs. In some cases, an external lighting controller requires power supplied from an LED driver to function. However, large power loss can occur when there is a large difference between an input voltage of an auxiliary power supply and the output voltage of the auxiliary power supply, or where a voltage drop across the linear regulator of the auxiliary power supply is large. As such, traditional linear regulators might not be able to be used for an auxiliary power supply, thereby increasing overall costs and reducing operating times associated with an LED driver.

BRIEF SUMMARY OF THE INVENTION

It is thus desirable to provide a low cost programmable auxiliary power supply with low power loss.

One object of the systems and methods disclosed herein is to provide an adjustable auxiliary power supply for a light emitting diode (LED) driver for adjusting an auxiliary power output. The adjustable auxiliary power supply includes a voltage regulator which receives a regulator input voltage and outputs an auxiliary power supply voltage selected from a first output voltage and a second output voltage according to a voltage selection signal. The voltage selection signal is received at the LED driver and is used to control an LED lighting setting controlled by the LED driver. The adjustable auxiliary power supply also includes a first input voltage circuit having a first control switch. The first input voltage circuit is associated with the first output voltage and selectively outputs a first input voltage to the voltage regulator as the regulator input voltage via the first control switch when the voltage selection signal corresponds to the first output voltage.

The adjustable auxiliary power supply also includes a second input voltage circuit having a second control switch. The second input voltage circuit is associated with the second output voltage and selectively outputs a second input voltage as the regulator input voltage via the second control switch when the voltage selection signal corresponds to the second output voltage. The adjustable auxiliary power supply further includes an adjustable resistance circuit coupled to the voltage regulator. The adjustable resistance circuit controls the auxiliary power supply voltage based upon an adjustable resistance setting of the adjustable resistance circuit. The adjustable resistance setting corresponds to at least one of the first output voltage and the second output voltage.

Another aspect of the systems and methods disclosed herein is a method of providing dynamically adjustable output from an auxiliary power supply having a voltage regulator in a light emitting diode (LED) lighting controller. The method begins by receiving a voltage selection signal corresponding to at least one of a first output voltage and a second output voltage of the auxiliary power supply. The method continues by outputting an auxiliary power supply voltage from the voltage regulator. The auxiliary power supply voltage is based upon an adjustable resistance setting of the auxiliary power supply which is determined in accordance with the voltage selection signal. A selected regulator input voltage may be provided to the voltage regulator from at least one of a first input voltage circuit and a second input voltage circuit according to the voltage selection signal. A power loss across the voltage regulator is managed based upon the outputting an auxiliary power supply voltage from the voltage regulator and the selecting a regulator input voltage provided to the voltage regulator according to the voltage selection signal.

A further aspect of the present invention is a light emitting diode (LED) lighting system. The LED lighting system includes an LED driver having a primary power supply, an auxiliary power supply, and an external controller. The primary power supply is coupled to an input power source. The primary power supply provides operating power to the LED driver. The adjustable auxiliary power supply includes a voltage regulator, a first input voltage circuit, a second input voltage circuit, and an adjustable resistance circuit.

The voltage regulator receives a regulator input voltage and outputs an auxiliary power supply voltage selected from a first output voltage and a second output voltage according to a voltage selection signal received from the LED driver. The first input voltage circuit includes a first control switch. The first input voltage circuit is associated with the first output voltage and selectively outputs a first input voltage as the regulator input voltage via the first control switch when the voltage selection signal corresponds to the first output voltage. A second input voltage circuit includes a second control switch. The second input voltage circuit is associated with the second output voltage and selectively outputs a second input voltage as the regulator input voltage via the second control switch when the voltage selection signal corresponds to the second output voltage. An adjustable resistance circuit is coupled to the voltage regulator. The adjustable resistance circuit controls the auxiliary power supply voltage based on an adjustable resistance setting of the adjustable resistance circuit. The adjustable resistance setting corresponds to at least one of the first output voltage and the second output voltage. The external controller is coupled to the adjustable auxiliary power supply and provides at least one LED lighting parameter signal to the LED driver.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-4, an exemplary auxiliary power supply, LED lighting system, and associated methods are now illustrated in greater detail. Where the various figures may describe embodiments sharing various common elements and features with other embodiments, similar elements and features are given the same reference numerals and redundant description thereof may be omitted below.

Figure 1:
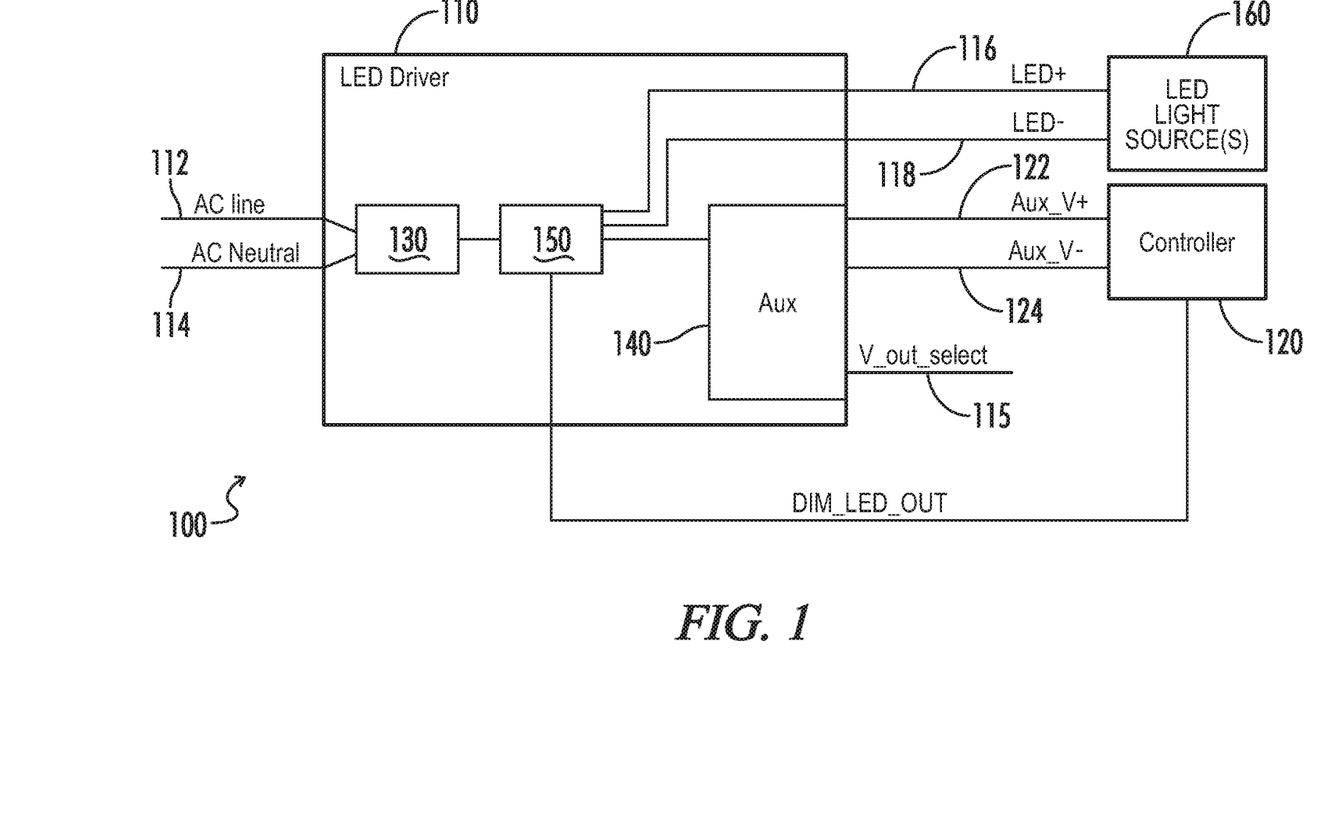
FIG. 1 illustrates a block diagram and partial circuit schematic diagram representing an embodiment of light emitting diode (LED) driver providing an auxiliary power supply output to an external controller according to aspects of the present invention.

FIG. 1 illustrates an LED lighting system 100 having an external controller 120 utilizing an auxiliary power supply 140 provided by an LED driver 110. The LED driver 110 receives power input from an alternating current (AC) line 112 and an AC neutral 114. The LED driver 110 includes a primary power supply 130 configured to connect to the AC line 112 and AC neutral 114 inputs and to provide direct current (DC) operating power to the LED driver 110. The LED driver 110 provides power and/or control for one or more LED light sources 160 via at least one of an LED+ 116 and an LED− 118 output from the LED driver 110. The LED driver 110 includes a controller 150. The controller 150 is configured in one exemplary embodiment to control operations of the LED driver 110. The controller 150 may be a microcontroller, a central processing unit, one or more specific processing devices configured either individually or in combination to perform one or more tasks, or any other means of performing at least one operation corresponding to the LED driver 110. Although illustrated as being within the LED driver 110, it should be appreciated that one or more component and/or one or more operations associated with the controller 150 may be performed either entirely or in part physically remote from the LED driver 110.

The LED driver 110 provides power to the controller 120 via one or more of auxiliary power outputs Aux_V+ 122 and Aux_V− 124. In one or more exemplary embodiments, the LED driver 110 includes a V_out_select input 115 configured to convey an auxiliary power supply voltage output selection to the LED driver 110. In one exemplary embodiment, the V_out_select input 115 is configured to be used by the LED driver 110 for providing auxiliary power to the controller 120 via the auxiliary power outputs Aux_V+ 122 and Aux_V− 124. The V_out_select input 115 may be used in various embodiments to send an initial and/or dynamic voltage selection signal to the LED driver 110 for use by the auxiliary power supply system 140 of the LED driver 110 in providing the auxiliary power outputs Aux_V+ 122 and Aux_V− 124.

In one exemplary embodiment, the V_out_select input 115 corresponds to an operational characteristic of the auxiliary power supply 140. Although illustrated as being received at the auxiliary power supply 140 of LED driver 110, it should be appreciated that the V_out_select input 115 may additionally or alternatively be received at one or more locations of LED driver 110 without departing from the spirit and scope of the present invention. For example, in one exemplary embodiment, the V_out_select input 115 is received at the LED driver 110 and is communicated to the controller 150 for processing and/or control of at least one of the auxiliary power supply 140, controller 120, and/or LED light source(s) 160.

The V_out_select input 115 may be configured to be used by the LED driver 110 to control a voltage setting of the auxiliary power supply 140 to reduce a power loss and/or heat generation across one or more components of the auxiliary power supply 140 (see, e.g., FIGS. 2-4 and their corresponding descriptions below). In one exemplary embodiment, the V_out_select input 115 may be used by the LED driver 110 to control a variable resistance associated with the auxiliary power supply 140 to select an output voltage of the auxiliary power supply 140 to the controller 120 (as described below with reference to FIGS. 3 and 4). Additionally or alternatively, the V_out_select input 115 may be used by the LED driver 110 to designate one or more input voltage circuits to provide input power to a voltage regulator of the auxiliary power supply 140 (see, e.g., FIG. 4 and its corresponding description below). In various embodiments, the V_out_select input 115 may be used by the LED driver 110 to coordinate both an input voltage setting of a voltage regulator of the auxiliary power supply 140 and an output voltage setting of the auxiliary power supply 140 so as to manage an power loss across the voltage regulator of the auxiliary power supply 140 (as described herein with reference to FIGS. 2-4).

As shown in FIG. 1, in various embodiments an external controller 120 may operate using a DC power supply (e.g., by means of an auxiliary power output of the LED driver 110). Although described with reference to a DC power supply, it should be appreciated that at least one of the LED driver 110, primary power supply 130, auxiliary power supply 140, and/or controller 120 may be configured in one or more embodiments to receive an AC input voltage and operate in accordance with the description herein. For example, one or more components if the LED lighting system 100 may convert an AC input into a DC signal, for example using a transformer (e.g., transformer T1 described herein). The controller 120 feeds a dim_LED_out signal back to the LED driver 110 for use in adjusting an LED light output. LED light output adjustments consistent with the present disclosure may include, for example, an LED lighting on/off setting, a dimming setting of LED light output, a color setting of LED light output, or any other setting associated with an operational setting of an LED lighting system.

In one exemplary embodiment, the controller 120 may be a daylight harvesting light sensor. In embodiments where the controller 120 is a daylight harvesting light sensor, the controller 120 may sense an amount of ambient light and to control the LED driver 110 to maintain a predetermined and/or dynamic light output, for example by measuring an ambient light level and either feeding back the ambient light level or transmitting an LED light output parameter or command to the LED driver 110 to dynamically conserve energy. Although described with reference to a daylight harvesting light sensor, it should be appreciated that the controller 120 may be variously take the form of one or more of a dimming controller, a trim lighting controller, an occupancy and/or vacancy sensor, an appliance control sensor, a wired or wireless controller, or any other controller configured to monitor, observe, and/or control at least one parameter of a lighting system.

The auxiliary power supply for the lighting controller 120 may be a low power output power supply, (e.g., around 1-2 watts). A DC-DC linear regulator (e.g., as illustrated and described with reference to element 210 of FIGS. 2-4) may be configured to ensure that there is not a large difference between the input and output voltages. Additionally or alternatively, the DC-DC linear regulator may be configured such that the voltage drop (or power dissipation) across the linear regulator is not too much (e.g., as shown in FIG. 2). In one exemplary embodiment, the linear regulator (e.g., linear regulator 210, also referred to herein as a voltage regulator) may take the form of a LM317 3-Terminal Adjustable Regulator. Although described with reference to a linear regulator, voltage regulator, or LM317 3-Terminal Adjustable Regulator, it should be appreciated that a linear regulator consistent with the present disclosure may take the form of any component capable of and configured to receive an input voltage and to output an adjustable voltage.

Figure 2:
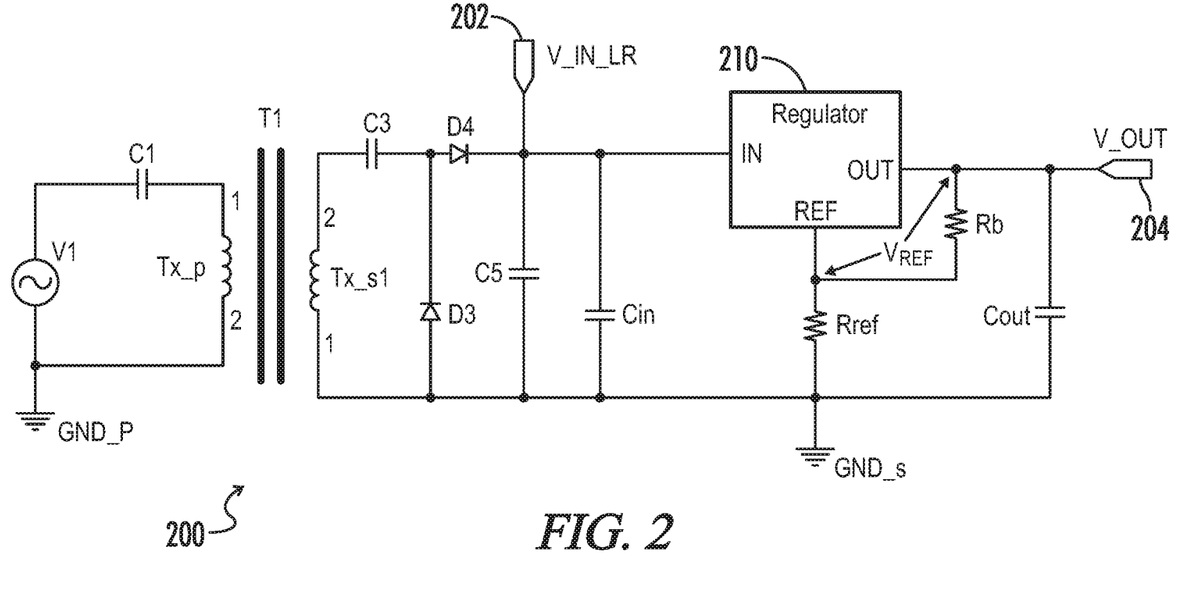
FIG. 2 illustrates a partial circuit schematic diagram for an embodiment of an auxiliary power supply having a single regulator input voltage and regulator reference voltage according to aspects of the present invention.

FIG. 2 illustrates an auxiliary power supply 200 utilizing a linear regulator 210 according to an exemplary embodiment. In FIG. 2, the linear regulator 210 regulates an output voltage V_OUT 204 of the auxiliary power supply 200 at a predetermined and/or dynamic level. In one exemplary embodiment, at least a portion of circuitry corresponding to the auxiliary power supply 200 may be included within an LED driver (e.g., LED driver 110). For example, power output by the auxiliary power supply 200 may be output along at least one of Aux_V+ and Aux_V− from the LED driver 110 towards the controller 120, as illustrated in FIG. 1. The input V_IN_LR 202 of the linear regulator 210 may be obtained from a charge pump circuit by rectifying a voltage received from a secondary winding Tx_s1 of a transformer T1. In one exemplary embodiment, the transformer T1 may be a small power transformer. The charge pump circuit illustrated by FIG. 2 may include, in one embodiment, at least one of the secondary winding Tx_s1, a capacitor C3, a diode D3, a diode D4, and a capacitor C5. The voltage source V1 of FIG. 2 is connected at one side to both a primary-side ground and an output of the primary winding Tx_p, and is connected to the capacitor C1 at the opposing side. The capacitor C1 is connected between the voltage source V1 and an input of the primary winding Tx_p.

The linear regulator 210 may include an input IN, an output OUT, and a reference REF. As previously described, an input voltage V_IN_LR may be received by the linear regulator 210 at the input IN. A reference REF may be used to modify an output voltage V_OUT 204 of the auxiliary power supply 200. The primary winding Tx_p may be driven by any constant voltage node in the LED driver 110. The capacitor C1 is a DC blocking capacitor in one embodiment. Resistors $R_b$ and $R_{ref}$ are output voltage adjustment resistors associated with the reference REF of linear regulator 210 in one exemplary embodiment. A reference voltage V_REF may be measured across the output OUT of the linear regulator 210 and the reference REF of the linear regulator 210. The resistors $R_b$ and $R_{ref}$ may be configured to control an output voltage V_OUT 204 of the linear regulator 210. An output current I_OUT may be measured at the same location as the output V_OUT 204 as illustrated by FIG. 2. The output voltage V_OUT 204 follows the equation:

$$V\_OUT = V\_REF * (1 + R_{ref}/R_b) \tag{1}$$

The power dissipation across the linear regulator 210 follows the equation:

$$P\_loss\_LR = (V\_IN\_LR - V\_OUT) * I\_OUT \tag{2}$$

As shown in equation (2), the power dissipation across linear regulator 210 has a close relationship with the output current and voltage drops across the linear regulator 210. In some cases, an adjustable auxiliary power supply 200, for example having a selectable output (e.g., 12V or 24V), may be desirable because different controllers (such as controller 120) may require different DC power supply characteristics. One solution is to implement an adjustable reference resistor to the circuit shown in FIG. 2. When an adjustable reference resistor is used, an output voltage of the linear regulator 210 (and thus of auxiliary power supply 200) may be selected in accordance with a desired setting.

Figure 3:
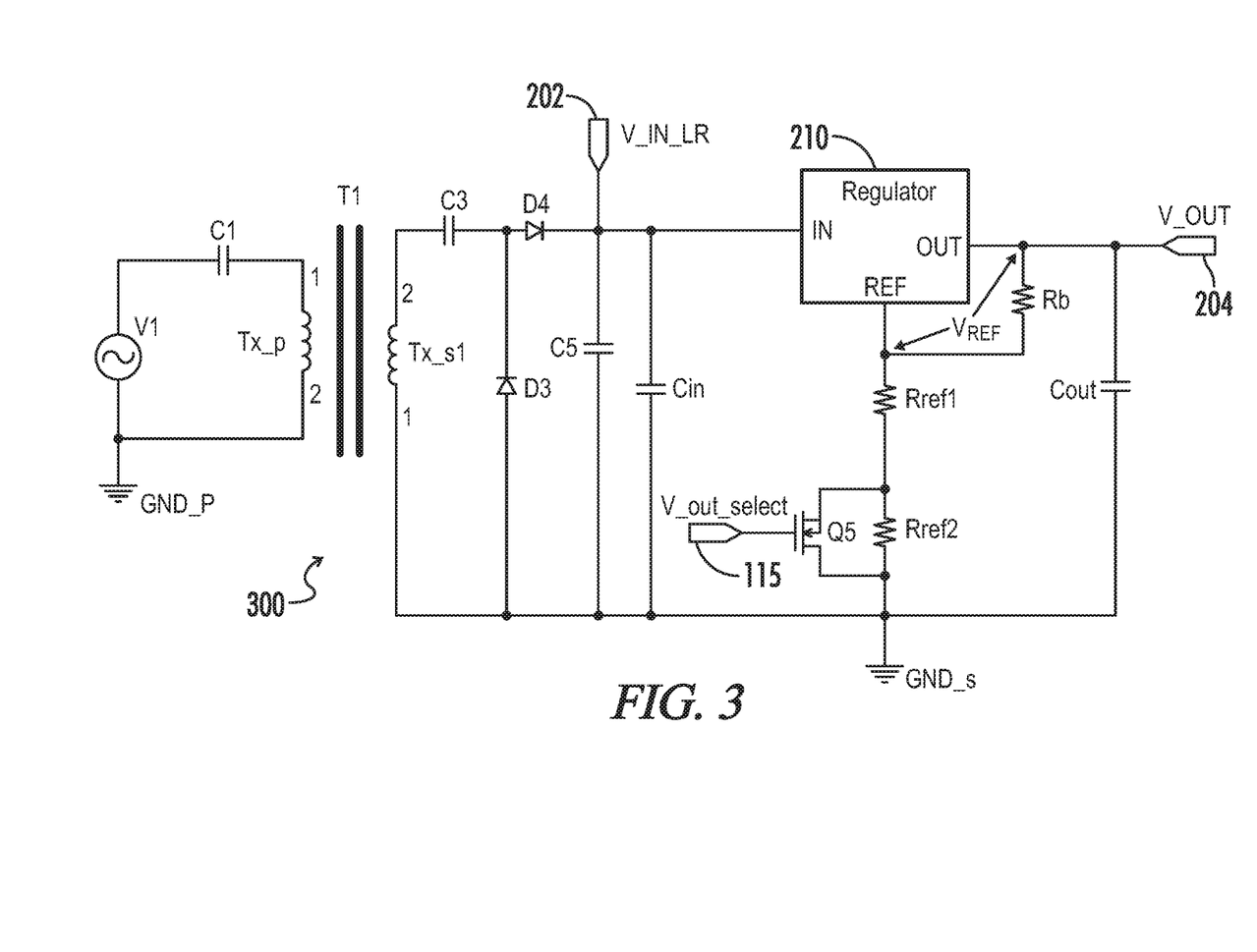
FIG. 3 illustrates a partial circuit schematic diagram for an embodiment of an auxiliary power supply having a single regulator input voltage and an adjustable regulator resistance voltage according to aspects of the present invention.

FIG. 3 illustrates an adjustable voltage output auxiliary power supply circuit 300 having a single input voltage to the linear regulator 210, in accordance with an exemplary embodiment. As shown in FIG. 3, an effective reference resistance can be changed by controlling a switch Q5 that is connected in parallel across resistor $R_{ref2}$. When the V_out_select input 115 is low (e.g., '0'), the switch Q5 remains open and the effective reference resistance connected to the reference REF of the linear regulator 210 is equal to the sum of resistors $R_{ref1}$ and $R_{ref2}$.

When V_out_select 115 is high (e.g. '1'), the switch Q5 conducts and effectively shorts the resistor $R_{ref2}$. In this case, the effective reference resistance is equivalent to the resistance of resistor $R_{ref1}$. A lower output voltage V_OUT_L may be output when the switch Q5 is conducting, as represented by the equation:

$$V\_OUT\_L = V\_REF * (1 + R_{ref1}/R_b) \tag{3}$$

When V_out_select 115 is low (e.g., '0'), the switch Q5 remains open. The resistors $R_{ref1}$ and $R_{ref2}$ are then connected in series in the circuit. A higher output voltage V_OUT_H may be output when the switch Q5 is open, and may be represented by the equation:

$$V\_OUT\_H = V\_REF * (1 + ((R_{ref1} + R_{ref2})/R_b)) \quad (4)$$

If there is a large difference between the high output voltage V_OUT_H and the low output voltage V_OUT_L (e.g., 24V vs. 12V), the input voltage V_IN_LR will have to be greater than the higher of the output voltage of V_OUT_L and V_OUT_H. For example, in an embodiment where V-OUT_L is 12V and V_OUT_H is 24V, the input voltage V_IN_LR will have to be greater than 24V when the output V_OUT corresponds to V_OUT_H. In this case, the voltage drop across the linear regulator 210 is large when the output voltage is low. As a result, in low output voltage implementations, the power loss across the linear regulator 210 as represented by equation (2) will be large.

In one exemplary implementation, at least a 26V input voltage to linear regulator 210 may be required for a 24V output from the auxiliary power supply 300. The input voltage to the linear regulator 210 may be provided, for example, at a higher voltage than the output voltage of the auxiliary power supply 300 according to an operational characteristic of the transformer T1. When output of the linear regulator 210 is controlled low (e.g. at 12V), the voltage drop will be 26V−12V=14V. If the output current in 12V output mode is 100 mA, the power loss will be 1.4 W, as reflected in equation (5):

$$P\_loss\_LR = (26\ V - 12\ V) * 0.1\ A = 1.4\ watt \quad (5)$$

Such a large power loss in the linear regulator 210 may cause the linear regulator 210 to rapidly heat and cause catastrophic failure. One possible solution is to provide a heat sink for the linear regulator 210 (not illustrated). The heat sink may be used to relieve heat stress on the linear regulator 210, but the power loss may not be resolved or maintained at an acceptable level using heat sink alone. Accordingly, a solution for providing adjustable auxiliary power supply output and controlling power loss and associated effects is needed to make a more efficient and practical LED driver.

Power dissipation according to equation (2) has a close relationship with output current and voltage drop across the linear regulator 210. The output current cannot be controlled in typical configurations, for example, because the output current is load dependent. However, the voltage drop across the linear regulator 210 can be controlled in each output mode consistent with implementations provided herein. One or more embodiments disclosed herein are capable of effectively solving linear regulator power dissipation problems discussed above.

Figure 4:
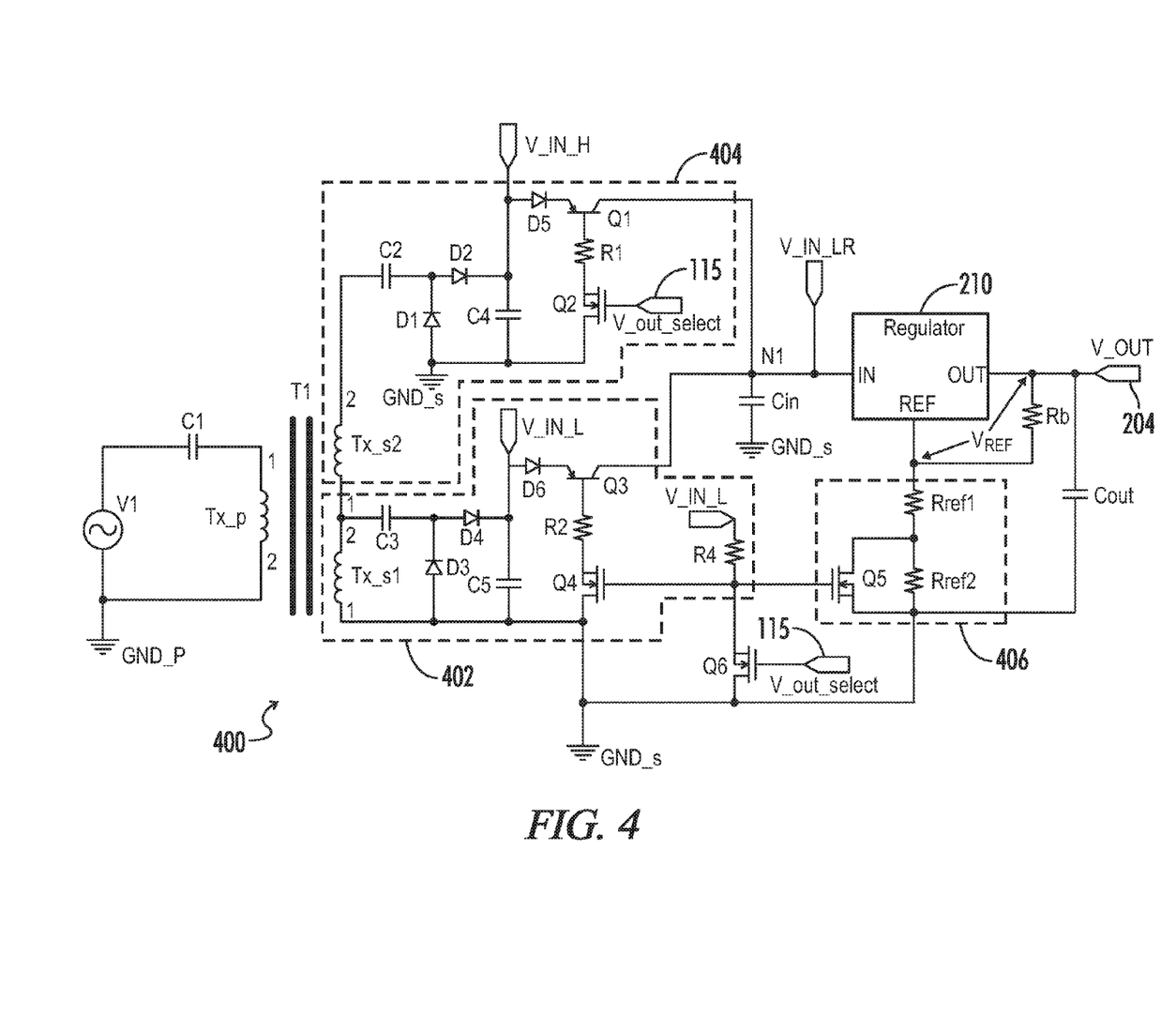
FIG. 4 illustrates a partial circuit schematic diagram for an embodiment of an auxiliary power supply having two regulator input voltage circuits and an adjustable regulator resistance voltage according to aspects of the present invention.

FIG. 4 illustrates a low loss auxiliary power supply 400 having a selectable output voltage. As shown in FIG. 4, two different input voltages may be associated with the linear regulator 210, V_IN_H (higher input) and V_IN_L (lower input). Higher input V_IN_H corresponds to a high output voltage from a high voltage input circuit 404 and lower input V_IN_L corresponds to a low voltage output from a low voltage input circuit 402, such that the voltage drop and power loss across the linear regulator 210 can be optimized for a plurality of operational settings. The auxiliary power supply 400 may include an adjustable resistance circuit 406 having at least one of a switch Q5 and resistors $R_{ref1}$ and $R_{ref2}$.

For example, in an implementation consistent with FIG. 4, providing a 1.2 watt auxiliary power supply port associated with an LED driver, when auxiliary power supply output V_OUT is 12V at 0.1 A and the lower input voltage V_IN_L provided by the low voltage input circuit 402 is set at 15V, the power loss across the linear regulator 210 will be 300 milliwatts. When auxiliary power supply output V_OUT is 24V at 0.05 A and the lower input voltage V_IN_L provided by the low voltage input circuit 402 is set at 27V, the power loss across the linear regulator 210 is 150 milliwatts.

Primary winding Tx_p of the transformer T1 may be configured in the same manner as and all the connections remain the same in FIG. 4 as shown in FIG. 2. Additionally or alternatively to the exemplary embodiment illustrated by FIG. 2, a secondary winding may include a tap, as illustrated by FIG. 4. Secondary windings Tx_s1 and Tx_s2 of transformer T1 in FIG. 4 are connected in series to provide different outputs. The secondary windings Tx_s2 and Tx_s1 of transformer T1 in series, the capacitor C2, diode D1, diode D2, and capacitor C4 form a charge pump circuit for the high input V_IN_H from the high voltage input circuit 404. The secondary winding Tx_s1 of transformer T1, capacitor C3, diode D3, diode D4, and capacitor C5 form a charge pump circuit for the low input V_IN_L provided by the low voltage input circuit 402.

Diodes D5 and D6 allow only one direction of current flow out of the high voltage input circuit 404 and low voltage input circuit 402, respectively. Switches Q1 and Q3 enable providing at least one of the higher input voltage V_IN_H from the high voltage input circuit 404 and the lower input voltage V_IN_L from the low voltage input circuit 402 to the linear regulator 210, as desired. Switch Q6 may take the form of a disable switch to disable at least one of the switches Q4 and Q5 in various embodiments.

In one exemplary embodiment, the default logic is for V_out_select input 115 to be set low (e.g., '0'). When V_out_select input 115 is set to low (e.g., '0'), switch Q1 is off because switch Q2 is on due to V_out_select input 115. The high input voltage V_IN_H input to the linear regulator 210 from the high voltage input circuit 404 is then disabled. Switch Q6 is also turned off by V_out_select input 115. The lower input voltage V_IN_L may be used to charge up the gate drive for switches Q4 and Q5 through resistor R4. As such, switches Q4 and Q5 may be configured to be on and operating in steady state when switch Q6 is off. The switch Q3 is turned on as a result of switch Q4 conducting. When switch Q3 is turned on, the low voltage input circuit 402 supplies the lower input voltage V_IN_L to the linear regulator 210. The on-state of switch Q5 effectively shorts resistor $R_{ref2}$ for the linear regulator 210. The auxiliary voltage supply output voltage V_OUT may then be set low according to $R_{ref1}$ as illustrated by equation (3).

When V_out_select input 115 is set to high, switch Q2 is turned on and, as a result, switch Q1 is turned on. Thus, the high voltage input circuit 404 is enabled to supply higher input voltage V_IN_H to the linear regulator 210. In the exemplary embodiment illustrated in FIG. 4, both an output of switch Q1 corresponding to the higher input voltage V_IN_H from the high voltage input circuit 404 and an output of switch Q3 corresponding to the lower input voltage V_IN_L from the low voltage input circuit 402 may be coupled at node N1. Capacitor $C_{in}$ may be connected at between node N1 and a common secondary-side ground. Switch Q6 is on when V_out_select input 115 is set to high (e.g., '1'). Switch Q6 is configured to disable the switches Q4 and Q3 such that the low voltage input circuit 402 (and thus lower input voltage V_IN_L) is disabled as input to the linear regulator 210. Switch Q5 is turned off when the switch Q6 is on. As such, the reference resistance is that of both $R_{ref1}$ and $R_{ref2}$ in series. The auxiliary power supply output voltage V_OUT will be high, in accordance with equation (4), when V_out_select input 115 is set high (e.g., '1').

Thus during operation, implementations consistent with FIG. 4 may be configured such that:

when V_out_select=high, V_IN_LR=high, and V_OUT=high; and when V_out_select=low, V_IN_LR=low, and V_OUT=low.

The performance of linear regulator 210 may be optimized by implementing systems consistent with the present disclosure. Furthermore, power loss may be minimized at low cost in accordance with the present disclosure.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims

What is claimed is:

1. An adjustable auxiliary power supply for a light emitting diode (LED) driver for adjusting an auxiliary power output, the adjustable auxiliary power supply comprising:
   a voltage regulator configured to receive a regulator input voltage and to output an auxiliary power supply voltage selected from a first output voltage and a second output voltage according to a voltage selection signal;
   a first input voltage circuit having a first control switch, the first input voltage circuit being associated with the first output voltage and being configured to selectively output a first input voltage as the regulator input voltage via the first control switch when the voltage selection signal corresponds to the first output voltage;
   a second input voltage circuit having a second control switch, the second input voltage circuit being associated with the second output voltage and being configured to selectively output a second input voltage as the regulator input voltage via the second control switch when the voltage selection signal corresponds to the second output voltage; and
   an adjustable resistance circuit coupled to the voltage regulator, the adjustable resistance circuit configured to control the auxiliary power supply voltage based on an adjustable resistance setting of the adjustable resistance circuit, the adjustable resistance setting corresponding to at least one of the first output voltage and the second output voltage.

2. The adjustable auxiliary power supply of claim 1, further comprising:
   a transformer having a primary winding and at least one secondary winding,
   wherein the first input voltage circuit further includes a first charge pump circuit coupled to the at least one secondary winding, the first charge pump circuit being configured to provide the first input voltage when the voltage selection signal corresponds to the first output voltage, and
   wherein the second input voltage circuit further includes a second charge pump circuit coupled to the at least one secondary winding, the second charge pump circuit being configured to provide the second input voltage when the voltage selection signal corresponds to the second output voltage.

3. The adjustable auxiliary power supply of claim 1, wherein the first input voltage circuit is configured to provide a higher voltage to the voltage regulator when the voltage selection signal corresponds to the first output voltage than is provided to the voltage regulator by the second input voltage circuit when the voltage selection signal corresponds to the second output voltage.

4. The adjustable auxiliary power supply of claim 3, wherein the first input voltage circuit is configured to provide the first output voltage sufficient for the auxiliary power supply voltage to be 24 volts and the second input voltage circuit is configured to provide the second output voltage sufficient for the auxiliary power supply voltage to be 12 volts.

5. The adjustable auxiliary power supply of claim 1, wherein each of the first input voltage circuit and the second input voltage circuit are configured to provide the regulator input voltage at a voltage greater than the auxiliary power supply voltage.

6. The adjustable auxiliary power supply of claim 1, wherein the adjustable resistance circuit comprises:
   a first resistor coupled to the voltage regulator;
   a second resistor coupled between the first resistor and a circuit ground; and
   an adjustment switch coupled in parallel across the second resistor, the adjustment switch being configured to control a total resistance of the adjustable resistance circuit.

7. The adjustable auxiliary power supply of claim 1, wherein the first input voltage circuit includes a first voltage selection switch coupled to a control terminal of the first control switch, the first voltage selection switch being configured to control a voltage output from the first input voltage circuit to the voltage regulator according to the voltage selection signal by selectively closing the first control switch when the voltage selection signal corresponds to the first output voltage.

8. The adjustable auxiliary power supply of claim 1, wherein the second input voltage circuit includes a second voltage selection switch coupled to a control terminal of the second control switch, the second voltage selection switch being configured to control voltage output from the second input voltage circuit to the voltage regulator according to the voltage selection signal by selectively closing the second control switch when the voltage selection signal corresponds to the second output voltage.

9. The adjustable auxiliary power supply of claim 8, wherein the adjustable resistance circuit comprises:
   a first resistor coupled to the voltage regulator;
   a second resistor coupled between the first resistor and a circuit ground; and
   an adjustment switch coupled in parallel across the second resistor, the adjustment switch being configured to control a total resistance of the adjustable resistance circuit, and
   the adjustable auxiliary power supply further includes,
      a disable switch coupled to a control terminal of the second voltage selection switch and to a control terminal of the adjustment switch, the disable switch controlled by a command signal received at a control terminal of the disable switch, the command signal corresponding to the voltage selection signal.

10. The adjustable auxiliary power supply of claim 9, wherein the disable switch is configured such that when the voltage selection signal identifies the first output voltage, the disable switch is configured to close and to thereby open both the second voltage selection switch and the adjustment switch.

11. The adjustable auxiliary power supply of claim 9, wherein the disable switch is configured such that when the voltage selection signal identifies the second output voltage, the disable switch is configured to open and to thereby cause the second voltage selection switch and the adjustment switch to close.

12. A method of providing dynamically adjustable output from an auxiliary power supply having a voltage regulator in a light emitting diode (LED) lighting controller, the method comprising:
   receiving a voltage selection signal corresponding to at least one of a first output voltage and a second output voltage of the auxiliary power supply;
   outputting an auxiliary power supply voltage from the voltage regulator, the auxiliary power supply voltage being based upon an adjustable resistance setting of the auxiliary power supply determined in accordance with the voltage selection signal;
   selecting a regulator input voltage provided to the voltage regulator from at least one of a first input voltage circuit and a second input voltage circuit according to the voltage selection signal; and
   managing a power loss across the voltage regulator based upon the outputting an auxiliary power supply voltage from the voltage regulator and the selecting the regulator input voltage provided to the voltage regulator according to the voltage selection signal.

13. The method of claim 12, wherein the outputting an auxiliary power supply voltage from the voltage regulator comprises:
   providing a higher voltage as input to the voltage regulator from the first input voltage circuit when the voltage selection signal corresponds to the first input voltage circuit than is provided to the voltage regulator by the second input voltage circuit when the voltage selection signal corresponds to the second input voltage circuit.

14. The method of claim 13, wherein the first input voltage circuit is configured to provide the voltage regulator with a first output voltage sufficient for the auxiliary power supply voltage to be 24 volts and wherein the second input voltage circuit is configured to provide the voltage regulator with a second output voltage sufficient for the auxiliary power supply voltage to be 12 volts.

15. The method of claim 12, further comprising:
   controlling a voltage output from the first input voltage circuit to the voltage regulator according to the voltage selection signal by selectively closing a first control switch of the first input voltage circuit when the voltage selection signal corresponds to a high voltage setting.

16. The method of claim 12, further comprising:
   controlling a voltage output from the second input voltage circuit to the voltage regulator according to the voltage selection signal by selectively closing a second control switch of the second input voltage circuit when the voltage selection signal corresponds to a low voltage setting.

17. The method of claim 12, wherein the voltage selection signal corresponds to a high voltage setting, and
   wherein the selecting the regulator input voltage provided to the voltage regulator includes turning on a disable switch of the second input voltage circuit, thereby
      (i) disabling a control switch of the second input voltage circuit and preventing power flow from the second input voltage circuit to the voltage regulator, and
      (ii) increasing a variable resistance associated with the voltage regulator by disabling a resistance adjustment switch coupled in parallel across a supplemental resistor coupled to a reference resistor coupled to the voltage regulator.

18. A light emitting diode (LED) lighting system comprising:
   an LED driver comprising,
      a primary power supply coupled to an input power source, the primary power supply configured to provide operating power to the LED driver;
      an adjustable auxiliary power supply including,
         a voltage regulator configured to receive a regulator input voltage and to output an auxiliary power supply voltage selected from a first output voltage and a second output voltage according to a voltage selection signal received from the LED driver;
         a first input voltage circuit having a first control switch, the first input voltage circuit being associated with the first output voltage and being configured to selectively output a first input voltage as the regulator input voltage via the first control switch when the voltage selection signal corresponds to the first output voltage;
         a second input voltage circuit having a second control switch, the second input voltage circuit being associated with the second output voltage and being configured to selectively output a second input voltage as the regulator input voltage via the second control switch when the voltage selection signal corresponds to the second output voltage; and an adjustable resistance circuit coupled to the voltage regulator, the adjustable resistance circuit configured to control the auxiliary power supply voltage based on an adjustable resistance setting of the adjustable resistance circuit, the adjustable resistance setting corresponding to at least one of the first output voltage and the second output voltage; and an external controller coupled to the adjustable auxiliary power supply, the external controller configured to provide at least one LED lighting parameter signal to the LED driver.

19. The LED lighting system of claim 18, wherein the external controller is a daylight harvesting light sensor, and wherein the LED lighting parameter signal is a control signal associated with an ambient light level.

20. The LED lighting system of claim 18, wherein the adjustable auxiliary power supply is configured to provide operating power to the external controller in accordance with a voltage level associated with the voltage selection signal.

* * * * *